United States Patent
Tsai et al.

(10) Patent No.: US 10,841,469 B2
(45) Date of Patent: Nov. 17, 2020

(54) IMAGE MODULE AND ELECTRONIC DEVICE

(71) Applicants: Meng-Huan Tsai, Taipei (TW); Yun-Tung Pai, Taipei (TW); Yen-Hua Hsiao, Taipei (TW); Chia-Hua Wu, Taipei (TW); Kung-Ju Chen, Taipei (TW); Chia-Chi Sun, Taipei (TW)

(72) Inventors: Meng-Huan Tsai, Taipei (TW); Yun-Tung Pai, Taipei (TW); Yen-Hua Hsiao, Taipei (TW); Chia-Hua Wu, Taipei (TW); Kung-Ju Chen, Taipei (TW); Chia-Chi Sun, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/186,598

(22) Filed: Nov. 12, 2018

(65) Prior Publication Data

US 2019/0364178 A1 Nov. 28, 2019

(30) Foreign Application Priority Data

May 22, 2018 (TW) .............................. 107117329 A

(51) Int. Cl.
*H04N 5/225* (2006.01)
*G03B 17/56* (2006.01)
(Continued)

(52) U.S. Cl.
CPC ......... *H04N 5/2253* (2013.01); *G03B 17/561* (2013.01); *G06F 1/1605* (2013.01);
(Continued)

(58) Field of Classification Search
CPC ............... H04N 5/2253; H04N 5/2257; H04N 5/23245; H04N 5/2251; G06F 1/1605; G06F 1/1616; G03B 17/561
See application file for complete search history.

(56) References Cited

U.S. PATENT DOCUMENTS

| 2012/0236195 A1* | 9/2012 | Chang ................... G06F 1/1686 348/333.06 |
| 2013/0192961 A1* | 8/2013 | Waters ................... A42B 1/244 200/43.18 |
| 2016/0157573 A1 | 6/2016 | Del Moral et al. |

FOREIGN PATENT DOCUMENTS

| CN | 1638404 | 5/2010 |
| TW | 200825665 | 6/2008 |

(Continued)

OTHER PUBLICATIONS

"Office Action of Taiwan Counterpart Application," dated Nov. 7, 2019, p. 1-p. 7.

*Primary Examiner* — Mekonnen D Dagnew
(74) *Attorney, Agent, or Firm* — JCIPRNET

(57) ABSTRACT

An image module is suitable for connecting a plate. The image module includes a first main body, a second main body, a first pivot portion and a second pivot portion. The second main body includes an image sensor. The first pivot portion is pivoted to the first main body and the second main body. The second pivot portion is pivoted to the second main body and the plate. The plate has a first side surface and a second side surface opposite to each other. The first main body and the second main body are pivoted through the first pivot portion and the second pivot portion between a first position, a second position and a third position on the first side surface and the second side surface of the plate.

16 Claims, 11 Drawing Sheets

(51) Int. Cl.
*H04N 5/232* (2006.01)
*G06F 1/16* (2006.01)

(52) U.S. Cl.
CPC ....... *H04N 5/2257* (2013.01); *H04N 5/23245* (2013.01); *G06F 1/1616* (2013.01)

(56) References Cited

FOREIGN PATENT DOCUMENTS

| TW | M376799 | 3/2010 |
| TW | M495530 | 2/2015 |

\* cited by examiner

IMAGE MODULE AND ELECTRONIC DEVICE

CROSS-REFERENCE TO RELATED APPLICATION

This application claims the priority benefit of Taiwan application serial no. 107117329, filed on May 22, 2018. The entirety of the above-mentioned patent application is hereby incorporated by reference herein and made a part of this specification.

BACKGROUND

Field of the Disclosure

The invention relates to an image module of an electronic device, and specifically relates to an image module having an image sensor capable of presenting many different modes and an electronic device including the image module.

Description of Related Art

Nowadays, in the age of information explosion, the electronic products are closely related to our daily lives. Along with the development of electronic technology, a design arranging a camera on the electronic device becomes more and more common, and the requirement of the camera capable of having more shooting angles and easy for users to switch between different camera modes increases. However, since the camera of the electronic device is merely embedded in the main frame or inside the display of the existing electronic device, the user is not allowed to adjust the application of different camera modes. Therefore, it is not easy for a user to use and increases the inconvenient for using when taking pictures.

SUMMARY

The invention provides an image module, suitable for connecting a plate, and more convenient in use.

The invention provides an electronic device including the image module capable of improving the convenience in use.

An image module of the invention is suitable for connecting a plate. The image module includes the first main body, the second main body, the first pivot portion and the second pivot portion. The second main body includes an image sensor. The first pivot portion is pivoted to the first main body and the second main body. The second pivot portion is pivoted to the second main body and the plate, and the plate has the first side surface and the second side surface opposite to each other. The first main body and the second main body are pivoted through the first pivot portion and the second pivot portion between the first position, the second position and the third position on the first side surface and the second side surface of the plate.

In one embodiment of the invention, the plate includes the first connecting element and the second connecting element, the first main body includes the third connecting element, and the third connecting element is suitable for connecting to the first connecting element or the second connecting element.

In one embodiment of the invention, when the first main body and the second main body are at the first position, the first main body is located on the first side surface of the plate, the third connecting element is connected to the first connecting element or the second connecting element, and a lens of the image sensor faces the first side surface of the plate to present a safe mode.

In one embodiment of the invention, when the first main body and the second main body are at the second position, the first main body is located on the second side surface of the plate, the third connecting element is connected to the first connecting element, and the second main body and the plate are located on the same axis and expose the lens of the image sensor to present the first shooting mode.

In one embodiment of the invention, when the first main body and the second main body are at the third position, the first main body and the second main body are located on the second side surface of the plate, the third connecting element is connected to the second connecting element, and a lens of the image sensor faces away from the plate to present the second shooting mode.

In one embodiment of the invention, the length of the first pivot portion is greater than or equal to the length of the second pivot portion.

An electronic device of the invention includes the first body and an image module. The first body includes a plate, and the image module is connected to the first body. The image module includes the first main body, the second main body, the first pivot portion and the second pivot portion. The second main body includes an image sensor. The first pivot portion is pivoted to the first main body and the second main body. The second pivot portion is pivoted to the second main body and the plate, the plate has the first side surface and the second side surface opposite to each other, the first main body and the second main body are pivoted through the first pivot portion and the second pivot portion between the first position, the second position and the third position on the first side surface and the second side surface of the plate.

In one embodiment of the invention, the electronic device includes the second body electrically connected to the first body, the first body further includes a display panel disposed on the plate, the plate includes the first connecting element and the second connecting element, the first main body includes the third connecting element, and the second body comprises the fourth connecting element.

In one embodiment of the invention, when the first main body and the second main body are at the first position, the second body is stacked on the first body, the first main body is located on the third side surface of the second body, the third connecting element is connected to the fourth connecting element, and a lens of the image sensor faces the fourth side surface connecting the first side surface with the second side surface of the first body to present a safe mode.

In one embodiment of the invention, when the first main body and the second main body are at the second position, the first main body is located on the second side surface of the plate, the third connecting element is connected to the first connecting element, and the second main body and the plate are located on a same axis and expose a lens of the image sensor to present the first shooting mode.

In one embodiment of the invention, when the first main body and the second main body are at the third position, the first main body and the second main body are located on the second side surface of the plate, the third connecting element is connected to the second connecting element, and a lens of the image sensor faces away from the plate to present the second shooting mode.

In one embodiment of the invention, the first body further includes a host computer and a display panel. The host computer is disposed between the plate and the display panel. The plate includes the first connecting element and the second connecting element, the first main body includes the third connecting element, the host computer includes the fourth connecting element, and the second main body includes the fifth connecting element.

In one embodiment of the invention, when the first main body and the second main body are at the first position, the first main body is located on the second side surface of the plate, the second main body is located on the third side surface of the host computer, the fourth connecting element is connected to the fifth connecting element, and a lens of the image sensor faces the third side surface of the host computer to present a safe mode.

In one embodiment of the invention, when the first main body and the second main body are at the second position, the first main body is located on the second side surface of the plate, the third connecting element is connected to the first connecting element, and the second main body and the plate are located on a same axis and expose a lens of the image sensor to present the first shooting mode.

In one embodiment of the invention, when the first main body and the second main body are at the third position, the first main body and the second main body are located on the second side surface of the plate, the third connecting element is connected to the second connecting element, and a lens of the image sensor faces away from the plate to present the second shooting mode.

In one embodiment of the invention, the length of the first pivot portion is greater than or equal to the length of the second pivot portion.

Based on the above, in the design of the image module of the invention, the first main body and the second main body are pivoted through the first pivot portion and the second pivot portion between the first position, the second position and the third position on the first side surface and the second side surface of the plate. As a result, the image sensor of the image module of the invention has a flippable/rotatable characteristic so as to present many different modes. Hence, the electronic device including this image module may be convenient for using In order to make the aforementioned and other features and advantages of the invention more comprehensible, embodiments accompanying figures are described in detail belows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
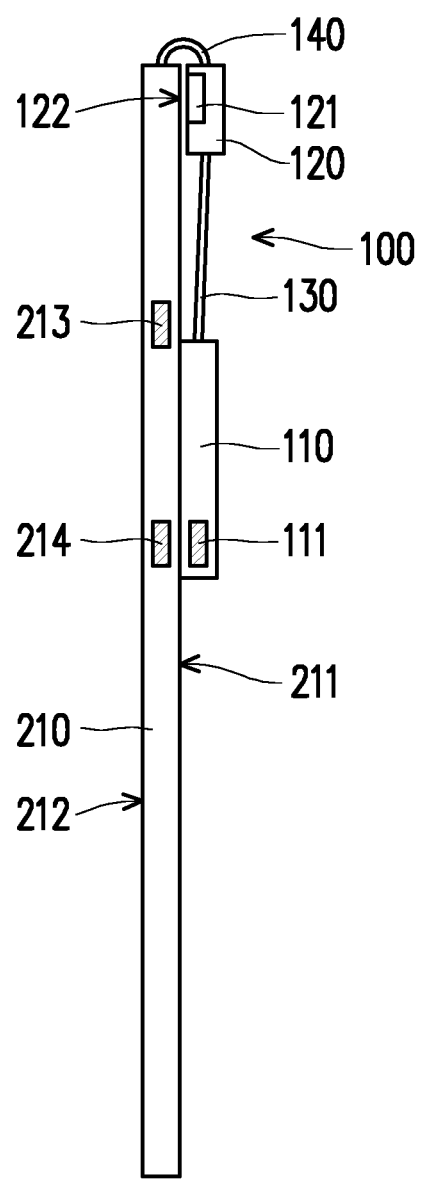
FIG. 1A is a schematic view depicting an image module in one embodiment of the invention.

Reference will now be made in detail to the present preferred embodiments of the disclosure, examples of which are illustrated in the accompanying drawings. Wherever possible, the same reference numbers are used in the drawings and the description to refer to the same or like parts.

Figure 1B:
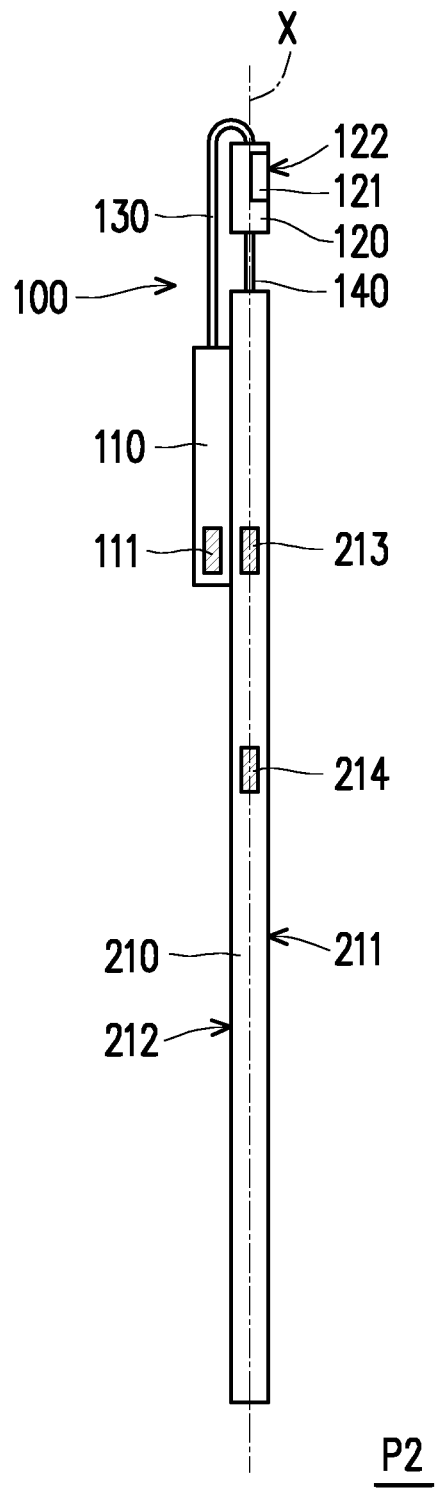
FIG. 1B is a schematic view depicting the first shooting mode of an image sensor of the image module in FIG. 1A.
Figure 1C:
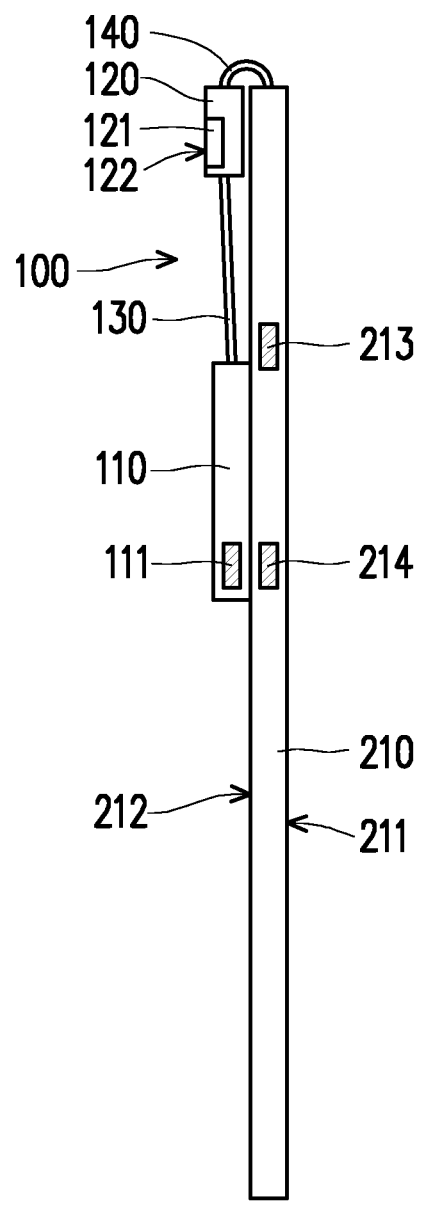
FIG. 1C is a schematic view depicting the second shooting mode of the image sensor of the image module in FIG. 1A.

FIG. 1A is a schematic view depicting an image module in one embodiment of the invention. FIG. 1B is a schematic view depicting the first shooting mode of an image sensor of the image module in FIG. 1A. FIG. 1C is a schematic view depicting the second shooting mode of the image sensor of the image module in FIG. 1A.

Referring to FIG. 1A, FIG. 1B, and FIG. 1C at the same time, in the present embodiment, an image module 100 is suitable for connecting a plate 210, wherein the plate 210 may be a plastic plate, a metal plate, or a back plate of a display device as an example, but the invention is not limited thereto. The image module 100 includes the first main body 110, the second main body 120, the first pivot portion 130 and the second pivot portion 140. The second main body 120 includes an image sensor 121, and the image sensor 121 may be a camera as an example, but the invention is not limited thereto. The first pivot portion 130 is pivoted to the first main body 110 and the second main body 120. The second pivot portion 140 is pivoted to the second main body 120 and the plate 210, and the plate 210 has the first side surface 211 and the second side surface 212 opposite to each other. The first pivot portion 130 and the second pivot portion 140 have bendable and flexible characteristics. The first main body 110 and the second main body 120 are pivoted through the first pivot portion 130 and the second pivot portion 140 between the first position P1, the second position P2 and the third position P3 on the first side surface 211 and the second side surface 212 of the plate 210, so that the image sensor 121 presents the safe mode, the first shooting mode, and the second shooting mode.

To be more specific, the plate 210 connected to the image module 100 includes the first connecting element 213 and the second connecting element 214, the first main body 110 includes the third connecting element 111, and the third connecting element 111 is suitable for connecting to the first connecting element 213 or the second connecting element 214. The connecting elements as above-mentioned are magnetic elements, such as magnets, locking elements, or hook-and-loop fasteners, for example, but the invention is not limited thereto. The third connecting element 111 of the first main body 110 is matched with and connected to the first connecting element 213 or the second connecting element 214 of the plate 210, so that the image sensor 121 of the second main body 120 presents the safe mode, the first shooting mode, and the second shooting mode.

To be more specific, referring to FIG. 1A, when the first main body 110 and the second main body 120 are at the first position P1, the first main body 110 is located on the first side surface 211 of the plate 210, the third connecting element 111 is connected to the second connecting element 214, and a lens 122 of the image sensor 121 faces the first side surface 211 of the plate 210 to present the safe mode. The lens 122 of the image sensor 121 faces the first side surface 211 of the plate 210, so the circumstance that the lens 122 of the image sensor 121 is exposed and is damaged or scratched by external force is prevented. In this way, the lens 122 of the image sensor 121 is protected when not being used.

It is further explained here, in other embodiments not shown here, when the first main body and the second main body are at the first position, the third connecting element may also be connected to the first connecting element according to the length of the first pivot portion, but the invention is not limited thereto. In order to make the lens 122 of the image sensor 121 provide shooting angle and shooting direction for the user through the first pivot portion 130 and the second pivot portion 140 having bendable and flexible characteristics, preferably, the length of the first pivot portion 130 is greater than or equal to the length of the second pivot portion 140. As shown in FIG. 1A, in the present embodiment, the length of the first pivot portion 130 is substantially greater than the length of the second pivot portion 140.

Referring to FIG. 1B again, when the first main body 110 and the second main body 120 are at the second position P2, the first main body 110 is located on the second side surface 212 of the plate 210, the third connecting element 111 is connected to the first connecting element 213, and the second main body 120 and the plate 210 are located on the same axis X and expose the lens 122 of the image sensor 121 to present the first shooting mode. When a target (not shown) the user wants to shoot and the user are located at the first side surface 211 of the plate 210, the second main body 120 is erected above the plate 210 by pivoting the first pivot portion 130, so that the lens 122 of the image sensor 121 faces the object, so as to present the first shooting mode which is self-portrait mode.

Referring to FIG. 1C, when the first main body 110 and the second main body 120 are at the third position P3, the first main body 110 and the second main body 120 are located on the second side surface 212 of the plate 210, the third connecting element 111 is connected to the second connecting element 214, and the lens 122 of the image sensor 121 faces away from the plate 210 to present the second shooting mode. In other words, when the target (not shown) the user wants to shoot and the user are located at the first side surface 211 and the second side surface 212 of the plate 210 separately, the lens 122 of the image sensor 121 is located on the same side as the second side surface 212 of the plate 210 by pivoting the second pivot portion 140, so that the lens 122 of the image sensor 121 faces away from the plate 210, so as to present the second shooting mode which is landscape mode.

Briefly, in designing the image module 100 of the present embodiment, the first main body 110 and the second main body 120 are pivoted through the first pivot portion 130 and the second pivot portion 140 between the first position P1, the second position P2 and the third position P3 on the first side surface 211 and the second side surface 212 of the plate 210, so that the image sensor 121 presents the safe mode, the first shooting mode, and the second shooting mode. As a result, the image sensor 121 of the present embodiment has a flippable/rotatable characteristic because of the first pivot portion 130 and the second pivot portion 140, so as to present many different modes. Hence, the convenience in use of the image module 100 in the present embodiment is improved.

It should be noted, the embodiments below utilize component labels and partial content from the aforementioned embodiments, wherein identical or similar elements are labeled with identical labels, and therefore description of similar technical content will be omitted. Regarding the description of the omitted parts, reference may be made to the previous embodiment, and will not be repeated in the below embodiment.

Figure 2A:
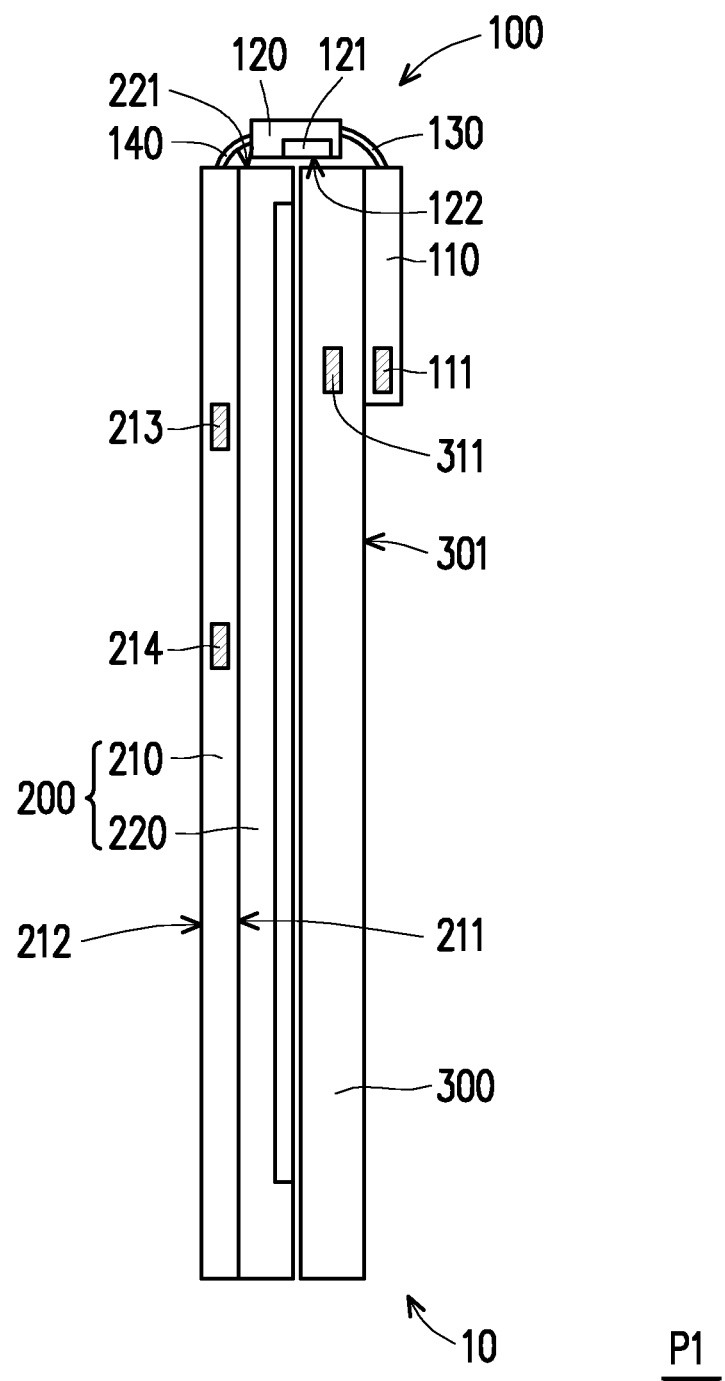
FIG. 2A is a schematic view depicting an electronic device in one embodiment of the invention.
Figure 2B:
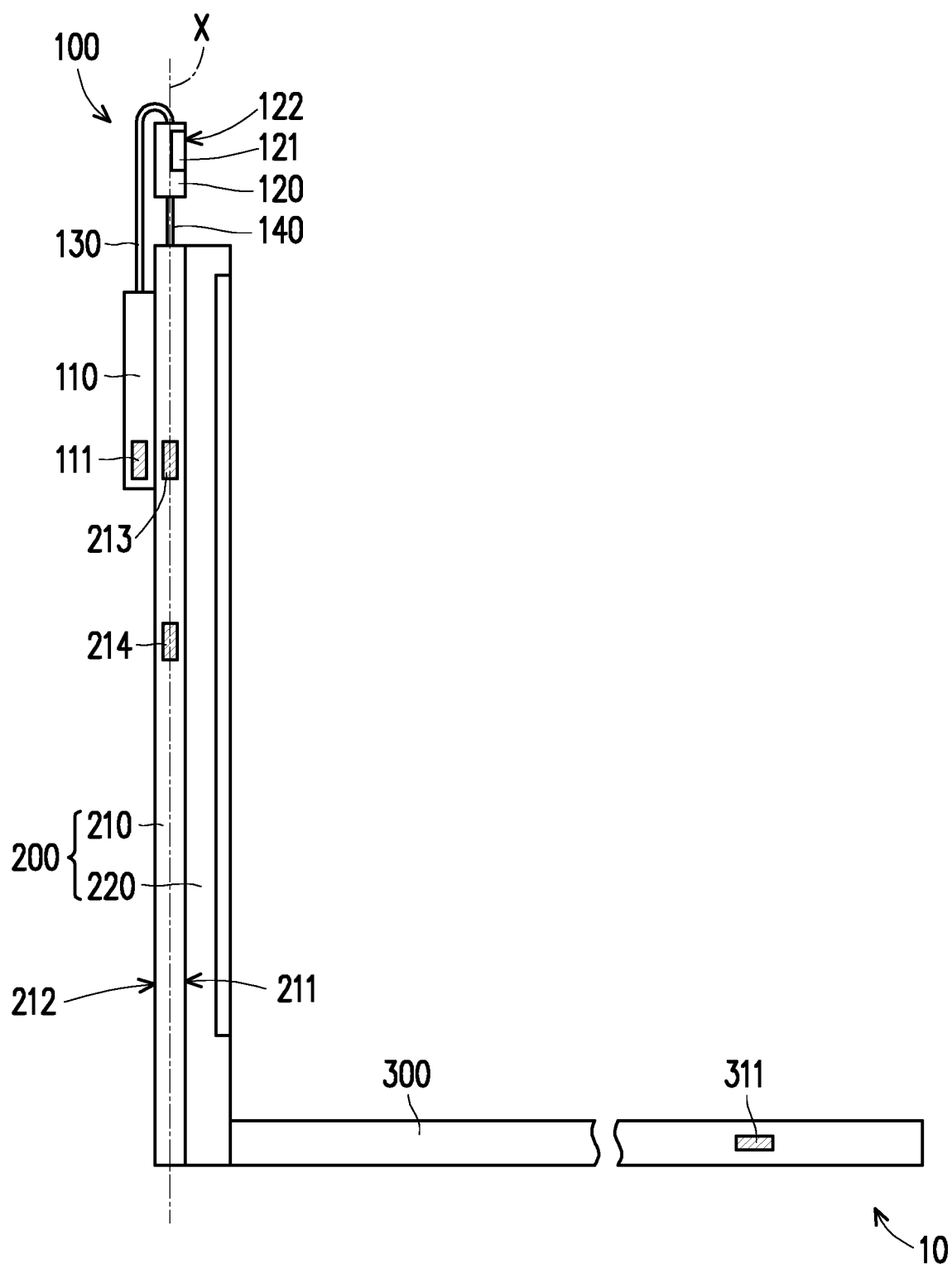
FIG. 2B is a schematic view depicting the first shooting mode of an image sensor of the electronic device in FIG. 2A.
Figure 2C:
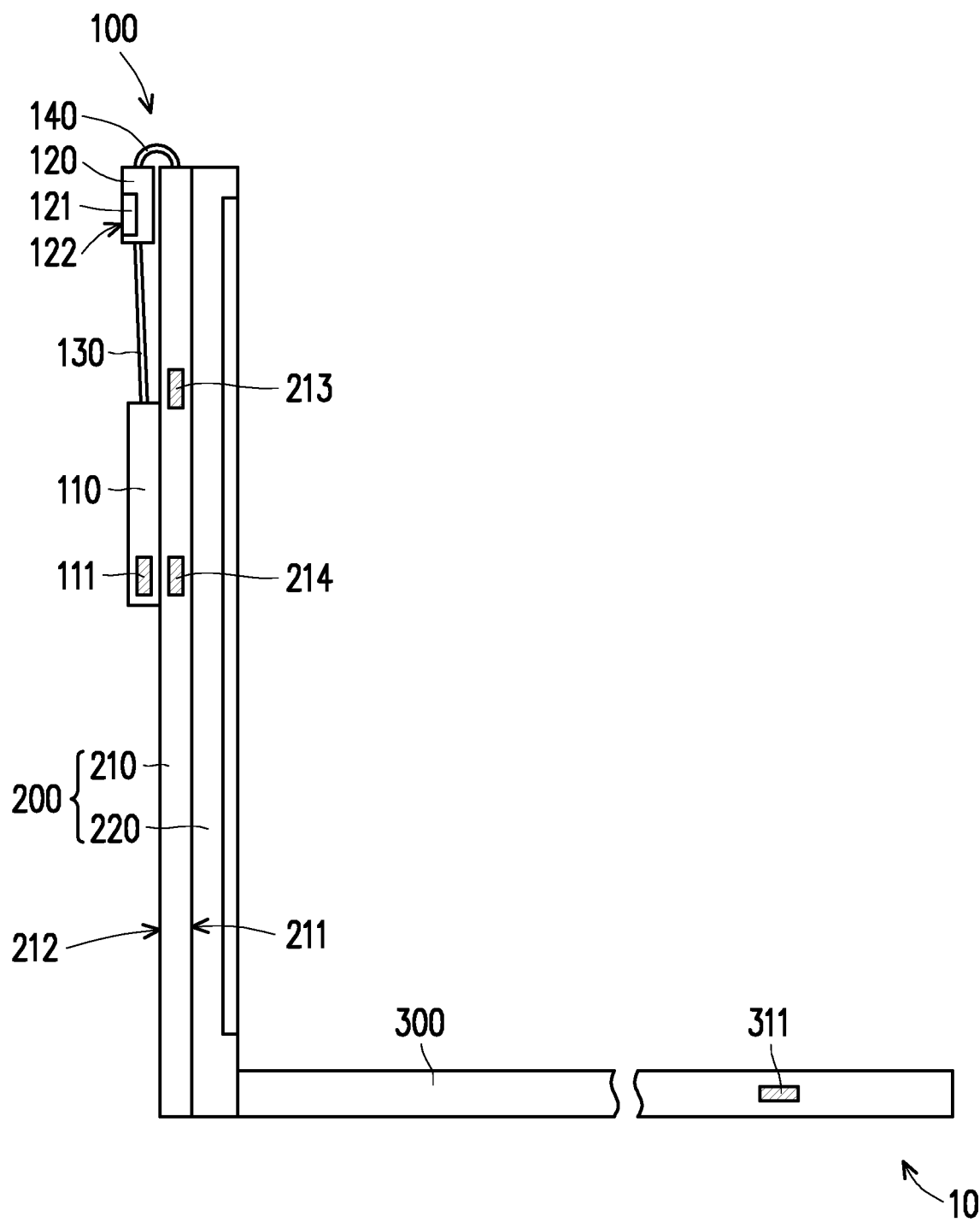
FIG. 2C is a schematic view depicting the second shooting mode of the image sensor of the electronic device in FIG. 2A.
Figure 3A:
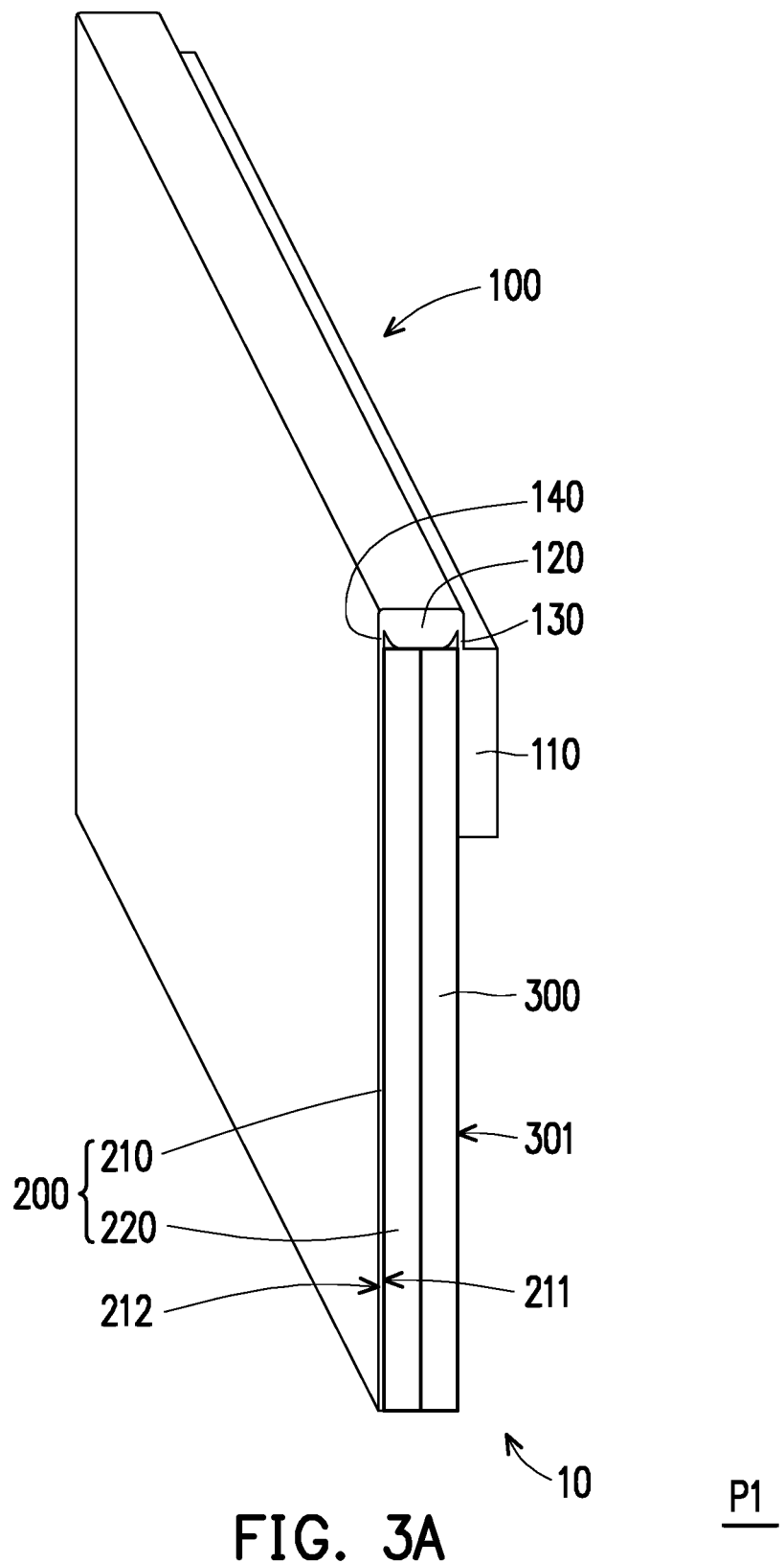
FIG. 3A is a three-dimensional schematic view depicting the electronic device in FIG. 2A.
Figure 3B:
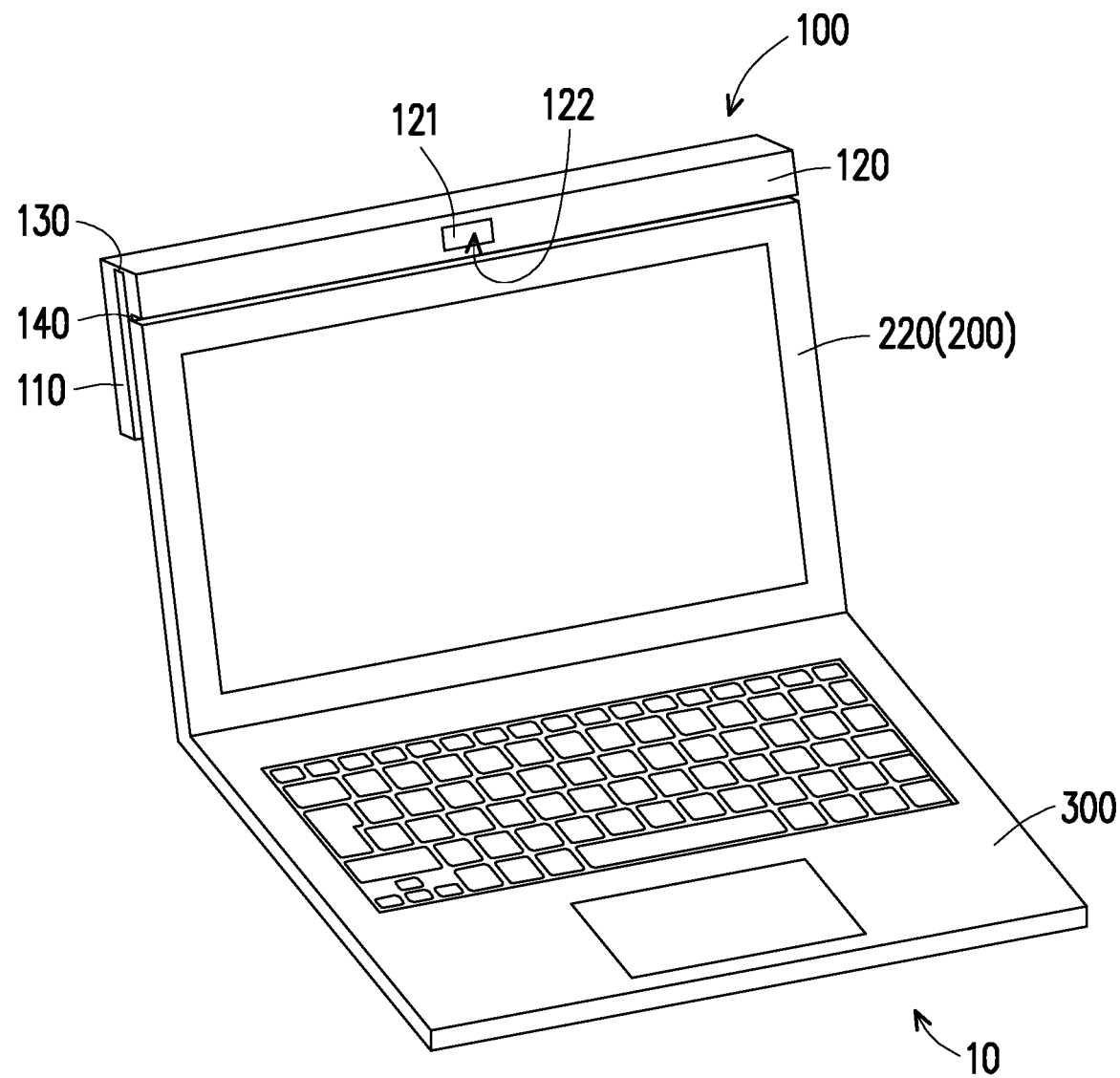
FIG. 3B is a three-dimensional schematic view depicting the electronic device in FIG. 2B.
Figure 3C:
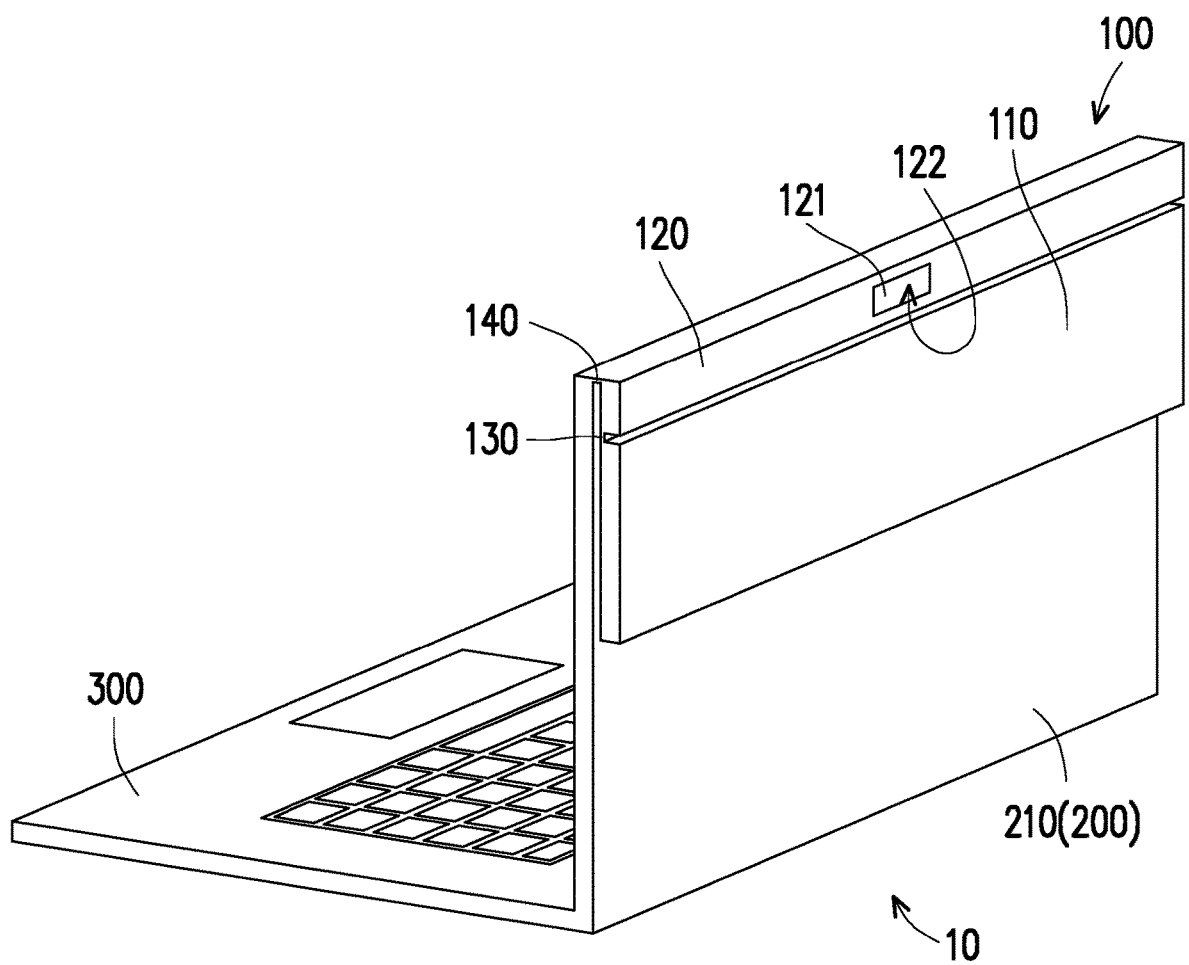
FIG. 3C is a three-dimensional schematic view depicting the electronic device in FIG. 2C.

FIG. 2A is a schematic view depicting an electronic device in one embodiment of the invention. FIG. 2B is a schematic view depicting the first shooting mode of an image sensor of the electronic device in FIG. 2A. FIG. 2C is a schematic view depicting the second shooting mode of the image sensor of the electronic device in FIG. 2A. FIG. 3A is a three-dimensional schematic view depicting the electronic device in FIG. 2A. FIG. 3B is a three-dimensional schematic view depicting the electronic device in FIG. 2B. FIG. 3C is a three-dimensional schematic view depicting the electronic device in FIG. 2C.

Referring to FIG. 2A and FIG. 3A simultaneously. An electronic device 10 of the present embodiment includes the image module 100, the first body 200, and the second body 300, and the electronic device 10 may be a notebook computer as an example, but the invention is not limited thereto. To be more specific, the first body 200 of the present embodiment includes the plate 210 and a display panel 220, and the display panel 220 is disposed on the plate 210. Herein, the plate 210 may be a back plate of the first body 200, but the invention is not limited thereto. The second body 300 is electrically connected to the first body 200, the second body 300 is pivotally connected to the first body 200 so as to be pivoted to the first body 200.

In the present embodiment, the image sensor 121 of the second main body 120 and the antenna (not shown) are electrically connected to the second body 300 through a flexible printed circuit board (not shown), so that the image captured by the image sensor 121 is transmitted to the second body 300, and the command signal of the second body 300 is transmitted through the flexible printed circuit board to control the operation of the image sensor 121. Or, the electrical signal between the antenna and the second body 300 is transmitted to each other through the flexible printed circuit board, which is not limited in the invention.

Referring to FIG. 2A and FIG. 3A simultaneously, the plate 210 of the present embodiment includes the first connecting element 213 and the second connecting element 214, the first main body 110 includes the third connecting element 111, and the second body 300 includes the fourth connecting element 311. When the first main body 110 and the second main body 120 are at the first position P1, the second body 300 is stacked on the first body 200. It means that, when the first body 200 and the second body 300 are at a closed state, the image module 100 surrounds the outer sides of the first body 200 and the second body 300. At this time, the first main body 110 is located on the third side surface 301 of the second body 300, the third connecting element 111 is connected to the fourth connecting element 311, and the lens 122 of the image sensor 121 faces the fourth side surface 221 connecting the first side surface 211 and the second side surface 212 to present the safe mode. The lens 122 of the image sensor 121 now is not exposed, and the function of protecting the lens is achieved.

Next, referring to FIG. 2B and FIG. 3B simultaneously, when the first main body 110 and the second main body 120 are at the second position P2, the first main body 110 is located on the second side surface 212 of the plate 210, the third connecting element 111 is connected to the first connecting element 213, and the second main body 120 and the plate 210 are located on the same axis X and expose the lens 122 of the image sensor 121 to present the first shooting mode, which is self-portrait mode. At this time, the first body 200 and the second body 300 may be disposed vertically, but the invention is not limited thereto.

[0051] Finally, referring to FIG. 2C and FIG. 3C, when the first main body 110 and the second main body 120 are at the third position P3, the first main body 110 and the second main body 120 are located on the second side surface 212 of the plate 210, the third connecting element 111 is connected to the second connecting element 214, and the lens 122 of the image sensor 121 faces away from the plate 210 to present the second shooting mode, which is landscape mode. At this time, the first body 200 and the second body 300 may be disposed vertically, but the invention is not limited thereto.

Briefly, in designing the image module 10 of the present embodiment, the first main body 110 and the second main body 120 of the image module 100 are pivoted through the first pivot portion 130 and the second pivot portion 140 between the first position P1, the second position P2 and the third position P3 on the first side surface 211 and the second side surface 212 of the plate 210, so that the image sensor 121 presents the safe mode, the first shooting mode, and the second shooting mode. As a result, the image sensor 121 of the present embodiment has a flippable/rotatable characteristic because of the first pivot portion 130 and the second pivot portion 140, so as to present many different modes. Hence, the convenience in use of the electronic device 10 of the present embodiment is improved.

It is worth mentioning that, in other embodiments not shown here, a connecting element may be disposed on the second main body, and another connecting element is disposed on the display panel correspondingly. When the first main body and the second main body are at the first position, the connecting element on the second main body may also be connected to the connecting element on the display panel, so that the image sensor presents the safe mode. The scope of the invention encompasses the above-mentioned embodiments.

Figure 4A:
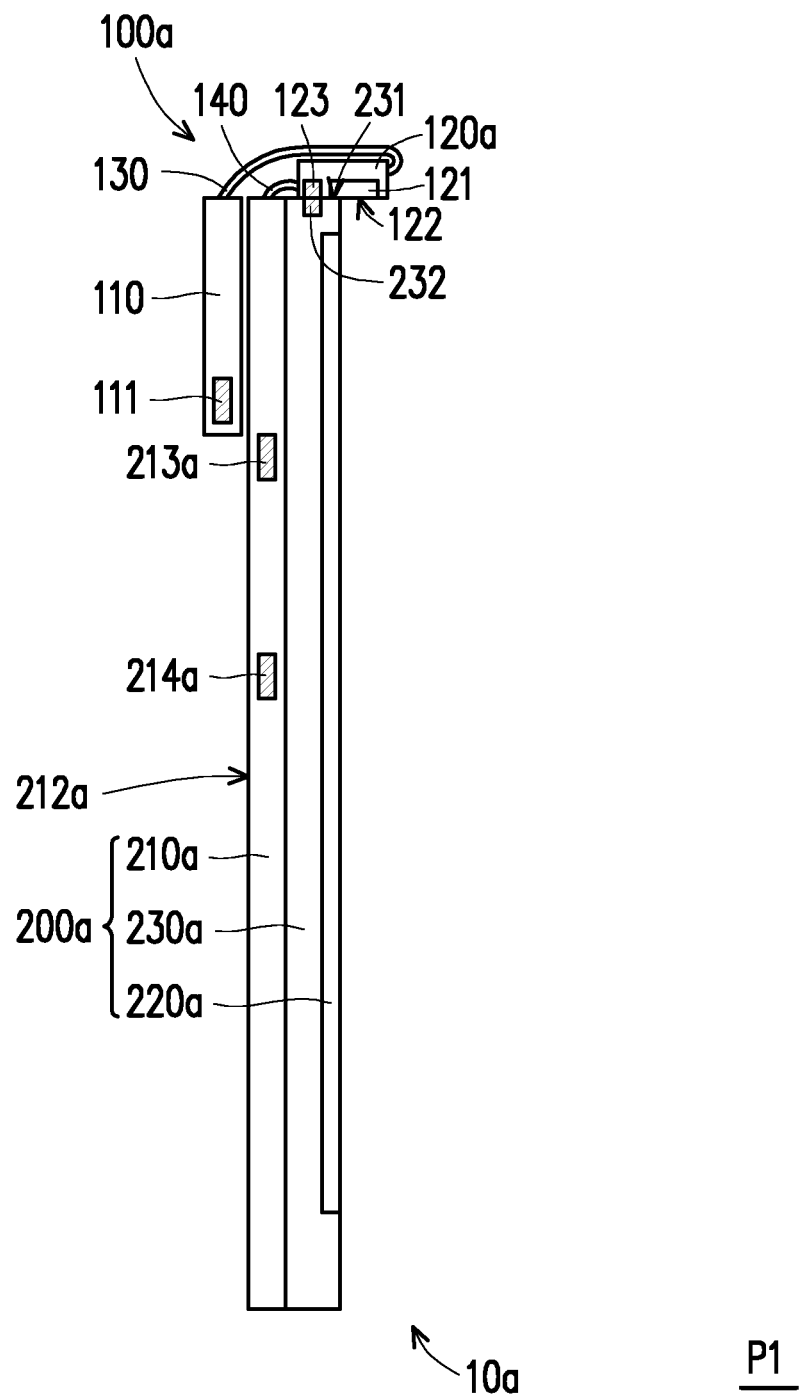
FIG. 4A is a schematic view depicting an electronic device in another embodiment of the invention.
Figure 4B:
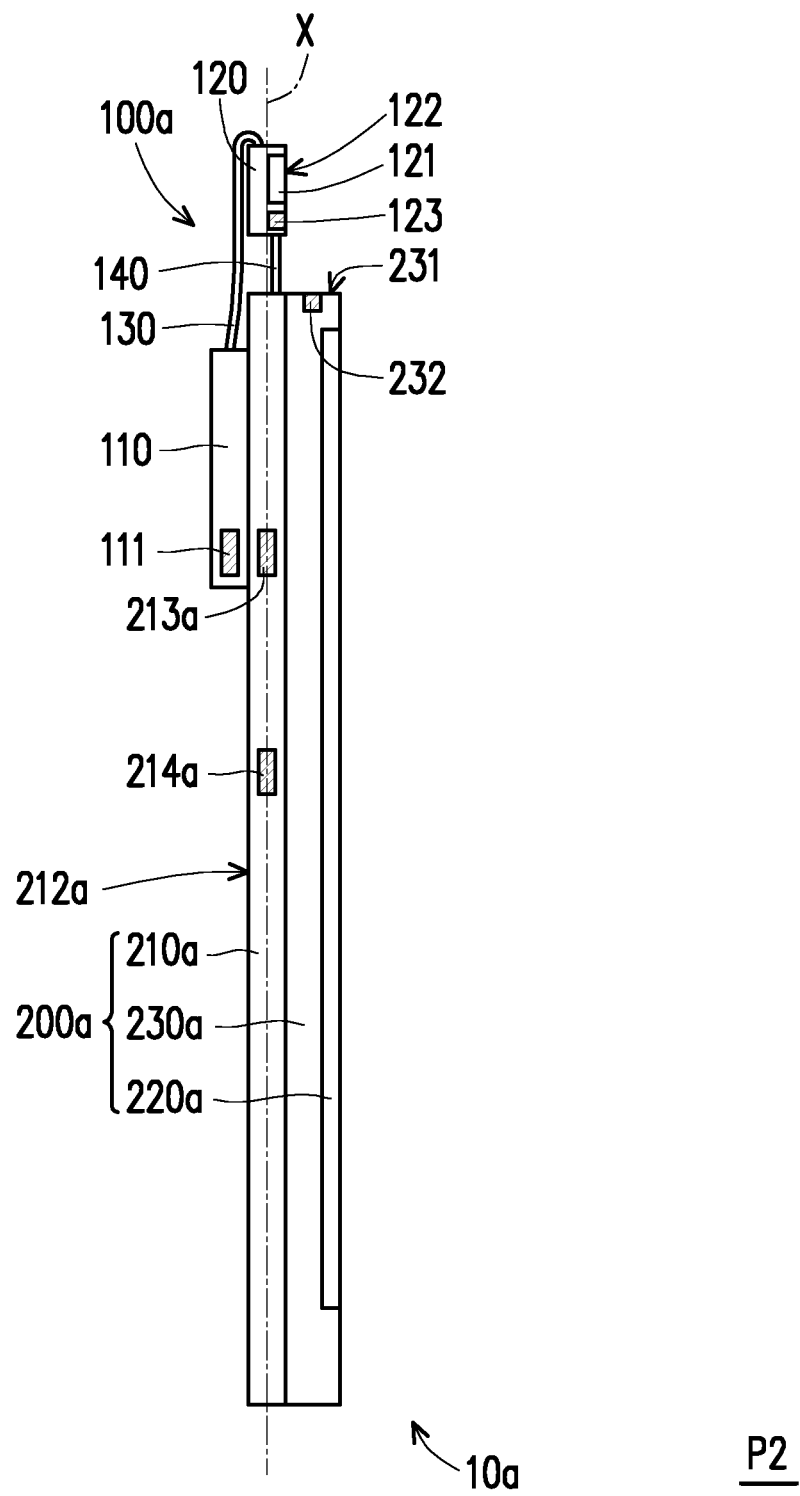
FIG. 4B is a schematic view depicting the first shooting mode of an image sensor of the electronic device in FIG. 4A.
Figure 4C:
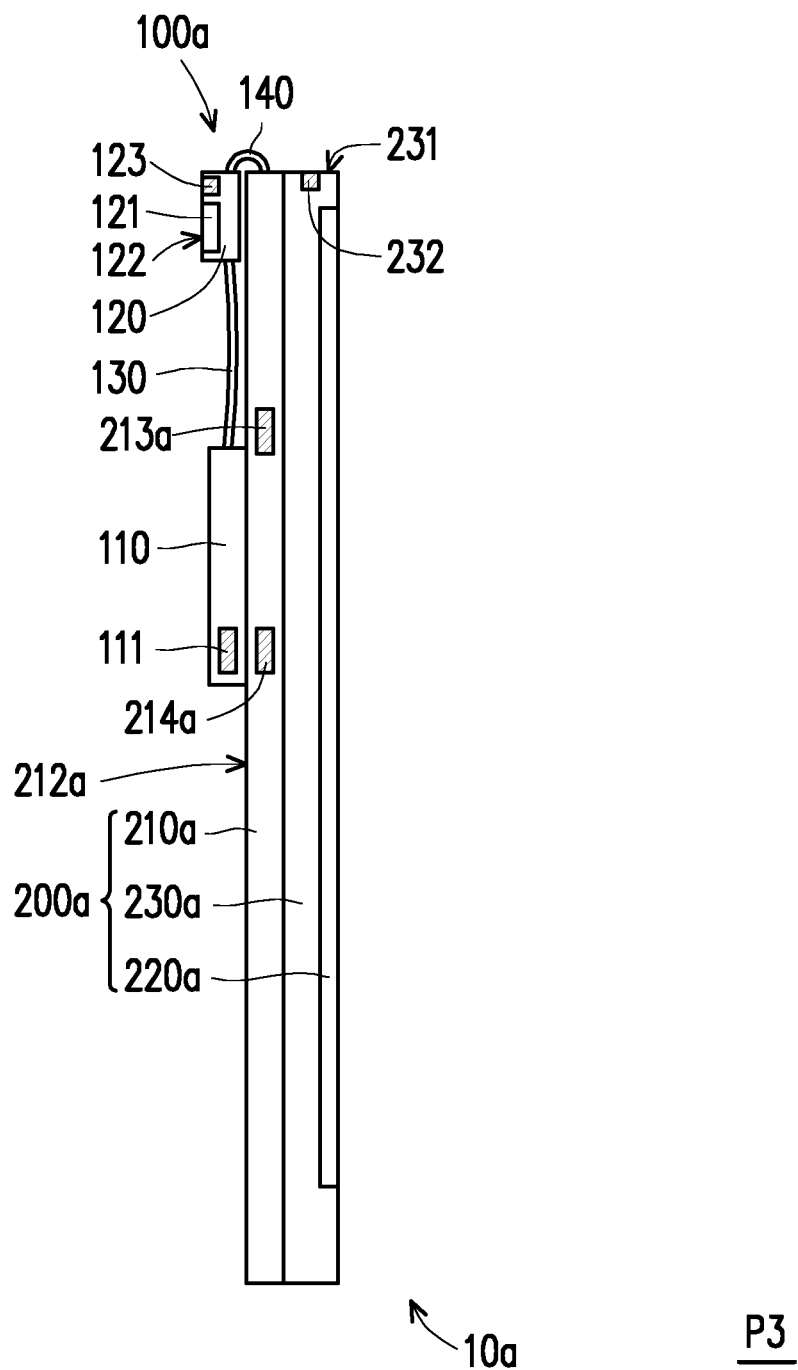
FIG. 4C is a schematic view depicting the second shooting mode of the image sensor of the electronic device in FIG. 4A.

FIG. 4A is a schematic view depicting an electronic device in another embodiment of the invention. FIG. 4B is a schematic view depicting the first shooting mode of an image sensor of the electronic device in FIG. 4A. FIG. 4C is a schematic view depicting the second shooting mode of the image sensor of the electronic device in FIG. 4A. Referring to FIG. 4A, in the present embodiment, an electronic device 10a includes an image module 100a and the first body 200a, the image module 100a is similar to the image module 100 of the aforementioned embodiment, and the electronic device 10a is a tablet computer or a cell phone, for example, but the invention is not limited thereto. To be more specific, the first body 200a of the present embodiment further includes a host computer 230a and a display panel 220a, and the host computer 230a is located between a plate 210a and the display panel 220a. Herein, the plate 210a may be a back plate of the host computer 230a, for example, but the invention is not limited thereto.

As shown in FIG. 4A, the plate 210a includes the first connecting element 213a and the second connecting element 214a, the first main body 110 includes the third connecting element 111, the host computer 230a includes a fourth connecting element 232, and the second main body 120a includes a fifth connecting element 123. When the first main body 110 and the second main body 120a are at the first position P1, the first main body 110 is located on the second side surface 212a of the plate 210a, the second main body 120a is located on the third side surface 231 of the host computer 230a, the fourth connecting element 232 is connected to the fifth connecting element 123. At this time, the lens 122 of the image sensor 121 faces the third side surface 231 of the host computer 230a to present the safe mode. Since the lens 122 of the image sensor 121 is not exposed, the effect of protecting the lens is achieved.

As shown in FIG. 4B, when the first main body 110 and the second main body 120a are at the second position P2, the first main body 110 is located on the second side surface 212a of the plate 210a, the third connecting element 111 is connected to the first connecting element 213a, and the second main body 120a and the plate 210a are located on the same axis X and expose the lens 122 of the image sensor 121 to present the first shooting mode, which is self-portrait mode.

As shown in FIG. 4C, when the first main body 110 and the second main body 120a are at the third position P3, the first main body 110 and the second main body 120a are located on the second side surface 212a of the plate 210a, the third connecting element 111 is connected to the second connecting element 214a, and the lens 122 of the image sensor 121 faces away from the plate 210a to present the second shooting mode, which is landscape mode.

Briefly, in designing the image module 10a of the present embodiment, the first main body 110 and the second main body 120a of the image module 100a are pivoted through the first pivot portion 130 and the second pivot portion 140 between the first position P1, the second position P2 and the third position P3 on the second side surface 212a of the plate 210a, so that the image sensor 121 presents the safe mode, the first shooting mode, and the second shooting mode. As a result, the image sensor 121 of the present embodiment has a flippable/rotatable characteristic because of the first pivot portion 130 and the second pivot portion 140, so as to present many different modes. Hence, the convenience in use of the electronic device 10a of the present embodiment is improved.

In summary, in designing the image module of the invention, the first main body and the second main body are pivoted through the first pivot portion and the second pivot portion between the first position, the second position and the third position on the first side surface and the second side surface of the plate, so that the image sensor presents the safe mode, the first shooting mode, and the second shooting mode. As a result, the image sensor of the image module of the invention has a flippable/rotatable characteristic so as to present many different modes. Hence, the convenience in use of the image module of the electronic device is improved.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An image module, suitable for connecting a plate, comprising:
 a first main body;
 a second main body, comprising an image sensor;

a first pivot portion, pivoted to the first main body and the second main body; and a second pivot portion, pivoted to the second main body and the plate, wherein the plate has a first side surface and a second side surface opposite to each other, the first main body and the second main body are pivoted through the first pivot portion and the second pivot portion between a first position, a second position and a third position on the first side surface and the second side surface of the plate, wherein the first pivot portion is rotated on a first axis, the second pivot portion is rotated on a second axis, and the first axis and the second axis are parallel to each other.

2. The image module as recited in claim 1, wherein the plate comprises a first connecting element and a second connecting element, the first main body comprises a third connecting element, and the third connecting element is suitable for connecting the first connecting element or the second connecting element.

3. The image module as recited in claim 2, wherein when the first main body and the second main body are at the first position, the first main body is located on the first side surface of the plate, the third connecting element is connected to the first connecting element or the second connecting element, and a lens of the image sensor faces the first side surface of the plate to present a safe mode.

4. The image module as recited in claim 2, wherein when the first main body and the second main body are at the second position, the first main body is located on the second side surface of the plate, the third connecting element is connected to the first connecting element, and the second main body and the plate are located on a same axis and expose the lens of the image sensor to present a first shooting mode.

5. The image module as recited in claim 2, wherein, when the first main body and the second main body are at the third position, the first main body and the second main body are located on the second side surface of the plate, the third connecting element is connected to the second connecting element, and the lens of the image sensor faces away from the plate to present a second shooting mode.

6. The image module as recited in claim 1, wherein a length of the first pivot portion is greater than or equal to a length of the second pivot portion.

7. An electronic device, comprising:
a first body, comprising a plate; and
an image module, connected to the first body and comprising:
a first main body;
a second main body, comprising an image sensor;
a first pivot portion, pivoted to the first main body and the second main body; and
a second pivot portion, pivoted to the second main body and the plate, wherein the plate has a first side surface and a second side surface opposite to each other, the first main body and the second main body are pivoted through the first pivot portion and the second pivot portion between a first position, a second position and a third position on the first side surface and the second side surface of the plate, wherein the first pivot portion is rotated on a first axis, the second pivot portion is rotated on a second axis, and the first axis and the second axis are parallel to each other.

8. The electronic device as recited in claim 7, further comprises:

a second body, electrically connected to the first body, wherein the first body further comprises a display panel disposed on the plate, the plate comprises a first connecting element and a second connecting element, the first main body comprises a third connecting element, and the second body comprises a fourth connecting element.

9. The electronic device as recited in claim 8, wherein when the first main body and the second main body are at the first position, the second body is stacked on the first body, the first main body is located on a third side surface of the second body, the third connecting element is connected to the fourth connecting element, and a lens of the image sensor faces a fourth side surface connecting the first side surface with the second side surface of the first body to present a safe mode.

10. The electronic device as recited in claim 8, wherein when the first main body and the second main body are at the second position, the first main body is located on the second side surface of the plate, the third connecting element is connected to the first connecting element, and the second main body and the plate are located on a same axis and expose a lens of the image sensor to present a first shooting mode.

11. The electronic device as recited in claim 8, wherein when the first main body and the second main body are at the third position, the first main body and the second main body are located on the second side surface of the plate, the third connecting element is connected to the second connecting element, and a lens of the image sensor faces away from the plate to present a second shooting mode.

12. The electronic device as recited in claim 7, wherein the first body further comprises a host computer and a display panel, the host computer is disposed between the plate and the display panel, the plate comprises a first connecting element and a second connecting element, the first main body comprises a third connecting element, the host computer comprises a fourth connecting element, and the second main body comprises a fifth connecting element.

13. The electronic device as recited in claim 12, wherein when the first main body and the second main body are at the first position, the first main body is located on the second side surface of the plate, the second main body is located on a third side surface of the host computer, the fourth connecting element is connected to the fifth connecting element, and a lens of the image sensor faces the third side surface of the host computer to present a safe mode.

14. The electronic device as recited in claim 12, wherein when the first main body and the second main body are at the second position, the first main body is located on the second side surface of the plate, the third connecting element is connected to the first connecting element, and the second main body and the plate are located on a same axis and expose a lens of the image sensor to present a first shooting mode.

15. The electronic device as recited in claim 12, wherein when the first main body and the second main body are at the third position, the first main body and the second main body are located on the second side surface of the plate, the third connecting element is connected to the second connecting element, and a lens of the image sensor faces away from the plate to present a second shooting mode.

16. The electronic device as recited in claim 7, wherein a length of the first pivot portion is greater than or equal to a length of the second pivot portion.

* * * * *